(12) United States Patent
Bahena et al.

(10) Patent No.: US 12,454,151 B1
(45) Date of Patent: Oct. 28, 2025

(54) ELECTRIC AXLE ASSEMBLY FOR A VEHICLE

(71) Applicant: Schaeffler Technologies AG & Co. KG, Herzogenaurach (DE)

(72) Inventors: Rodrigo Bahena, Puebla (MX); Patrick Lindemann, Wooster, OH (US); David Burky, Massillon, OH (US); Angel Salvador Flores, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/811,296

(22) Filed: Aug. 21, 2024

(51) Int. Cl.
| | |
|---|---|
| B60K 17/16 | (2006.01) |
| B60B 35/16 | (2006.01) |
| B60K 1/00 | (2006.01) |
| F16H 57/029 | (2012.01) |
| F16H 57/031 | (2012.01) |
| F16H 57/037 | (2012.01) |
| F16H 57/02 | (2012.01) |

(52) U.S. Cl.
CPC .............. B60B 35/16 (2013.01); B60K 1/00 (2013.01); B60K 17/165 (2013.01); F16H 57/029 (2013.01); F16H 57/031 (2013.01); F16H 57/037 (2013.01); B60B 2900/113 (2013.01); B60B 2900/115 (2013.01); F16H 2057/02034 (2013.01); F16H 2057/02052 (2013.01)

(58) Field of Classification Search
CPC ............... B60B 35/16; B60B 2900/113; B60B 2900/115; B60K 17/165; B60K 1/00; F16H 57/029; F16H 57/031; F16H 57/037; F16H 2057/02034; F16H 2057/02052
See application file for complete search history.

(56) References Cited

U.S. PATENT DOCUMENTS

| | | | |
|---|---|---|---|
| 10,500,940 B2* | 12/2019 | Garcia | ..................... B60K 1/00 |
| 2018/0099556 A1 | 4/2018 | Falls et al. | |
| 2018/0297401 A1* | 10/2018 | Liu | ........................... B60K 1/02 |
| 2019/0315216 A1* | 10/2019 | Ziech | ........................ B60K 6/26 |
| 2020/0086731 A1* | 3/2020 | Yohannes | ............. F16H 57/025 |
| 2020/0108706 A1* | 4/2020 | Devreese | ............. F16H 57/029 |

(Continued)

FOREIGN PATENT DOCUMENTS

CN 108638839 B 9/2019

*Primary Examiner* — Farhana Pervin
(74) *Attorney, Agent, or Firm* — Price Heneveld LLP (57) ABSTRACT

An electric axle assembly includes a banjo axle housing, first and second half shafts, and an electric drive unit. The banjo axle housing has a central portion that defines a receiving space and first and second openings providing access to the receiving space, first and second beams extending from the central portion in opposite first and second axial directions, and defining first and second beam hollows in communication with the receiving space. The half shafts extend within the first and second beam hollows. The electric drive unit includes a motor, a differential, and a housing having first and second housing components. At least one of the first and second housing components defines a motor housing region, the first and second housing components define a gearbox region, and the first and second housing components define first and second apertures that provide access for coupling the half shafts with the differential.

19 Claims, 5 Drawing Sheets

(56) References Cited

U.S. PATENT DOCUMENTS

| | | | | |
|---|---|---|---|---|
| 2020/0130412 | A1* | 4/2020 | He | B60B 35/122 |
| 2020/0189375 | A1* | 6/2020 | Hayashi | F16H 57/02 |
| 2020/0200258 | A1* | 6/2020 | Nahrwold | F16H 57/04 |
| 2020/0406682 | A1* | 12/2020 | Ogawa | B21D 53/90 |
| 2021/0138885 | A1* | 5/2021 | Engerman | B60K 17/16 |
| 2021/0252977 | A1* | 8/2021 | Engerman | B60K 1/00 |
| 2021/0254686 | A1* | 8/2021 | Engerman | F16H 48/06 |
| 2022/0097509 | A1* | 3/2022 | Larsson | B60K 1/00 |
| 2022/0297520 | A1* | 9/2022 | Mepham | B60K 17/08 |
| 2022/0410703 | A1* | 12/2022 | Engerman | B60K 1/00 |
| 2023/0110432 | A1* | 4/2023 | Laforce | F16H 57/029 |
| | | | | 310/54 |
| 2023/0143471 | A1* | 5/2023 | Byrne | B23K 11/02 |
| | | | | 301/137 |
| 2023/0202294 | A1* | 6/2023 | Engerman | B60K 17/16 |
| | | | | 74/607 |
| 2023/0311820 | A1* | 10/2023 | Fox | F16H 63/345 |
| | | | | 475/150 |
| 2023/0392672 | A1* | 12/2023 | Cattoor | B60K 17/08 |
| 2024/0100936 | A1* | 3/2024 | Trudel | B60K 11/02 |
| 2024/0181858 | A1* | 6/2024 | Gerding | F16H 57/021 |
| 2024/0270067 | A1* | 8/2024 | Karlsson | B60K 17/165 |
| 2024/0317046 | A1* | 9/2024 | Engerman | B60K 17/16 |
| 2025/0018781 | A1* | 1/2025 | Mepham | F16H 37/0806 |
| 2025/0058621 | A1* | 2/2025 | Gulhane | B60K 8/00 |

\* cited by examiner

ELECTRIC AXLE ASSEMBLY FOR A VEHICLE

FIELD OF THE DISCLOSURE

The present disclosure generally relates to an axle assembly for a vehicle. More specifically, the present disclosure relates to an axle assembly for a vehicle that includes a banjo axle housing and an electric drive unit disposed within the banjo axle housing.

BACKGROUND OF THE DISCLOSURE

Axle assemblies can include housings to house various components, such as half shafts and differentials.

SUMMARY OF THE DISCLOSURE

According to a first aspect of the present disclosure, an electric axle assembly includes a banjo axle housing, a first half shaft, a second half shaft, and an electric drive unit. The banjo axle housing has a central portion that defines a receiving space and first and second openings that provide access to the receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The first half shaft extends within the first beam hollow, and the second half shaft extends within the second beam hollow. The electric drive unit includes a motor that drives rotation of a rotor shaft about an axis, a differential operably coupled with the rotor shaft, and a housing having a first housing component and a second housing component fastened to the first housing component. At least one of the first housing component and the second housing component defines a motor housing region within which the motor is housed, the first and second housing components cooperate to define a gearbox region within which the differential is housed, the first housing component defines a first aperture that provides access for operable coupling of the first half shaft with the differential, and the second housing component defines a second aperture that provides access for operable coupling of the second half shaft with the differential.

Embodiments of the first aspect of the disclosure can include any one or a combination of the following features:
the first housing component defines the motor housing region;
the motor housing region is wholly outside of the receiving space;
the housing further comprises an end cap that is fastened to the first housing component and cooperates with the first housing component to define the motor housing region;
the first and second housing components extend into the receiving space via the first opening and out of the receiving space via the second opening;
at least one bolt that fastens the first housing component to the second housing component, the bolt having a shaft extending lengthwise parallel to the axis within the first and second housing components;
the first housing component is fastened to the second housing component at a junction, such that the first housing component is axially adjacent to the second housing component;
the entirety of the first housing component is positioned on a first axial side of the junction, and the entirety of the second housing component is positioned on a second axial side of the junction opposite the first axial side;
a sealing element extends axially between the first housing component and the second housing component at the junction; and
a portion of the gearbox region that is defined cooperatively by the first and second housing components extends from outside of the receiving space, into the receiving space via the first opening, and out of the receiving space via the second opening.

According to a second aspect of the present disclosure, an electric axle assembly includes a banjo axle housing and an electric drive unit. The banjo axle housing has a central portion that defines a receiving space and first and second openings that provide access to the receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The electric drive unit includes a motor that drives rotation of a rotor shaft about an axis, a differential operably coupled with the rotor shaft, and a housing having a first housing component and a second housing component that is fastened to the first housing component at a junction, such that the first housing component is axially adjacent to the second housing component. At least one of the first housing component and the second housing component defines a motor housing region within which the motor is housed, and the first and second housing components cooperate to define at least a portion of a gearbox region that extends from outside of the receiving space, into the receiving space via the first opening, and out of the receiving space via the second opening.

Embodiments of the second aspect of the disclosure can include any one or a combination of the following features:
the entirety of the first housing component is positioned on a first axial side of the junction, and the entirety of the second housing component is positioned on a second axial side of the junction opposite the first axial side;
a sealing element extends axially between the first housing component and the second housing component at the junction;
the first housing component defines the motor housing region;
the motor housing region is wholly outside of the receiving space;
the housing further comprises an end cap that is fastened to the first housing component and cooperates with the first housing component to define the motor housing region; and
a first half shaft that extends within the first beam hollow, and a second half shaft that extends within the second beam hollow, wherein the first housing component defines a first aperture that provides access for operable coupling of the first half shaft with the differential, and the second housing component defines a second aperture that provides access for operable coupling of the second half shaft with the differential.

According to a third aspect of the present disclosure, an electric axle assembly includes a banjo axle housing, a first half shaft, a second half shaft, and an electric drive unit. The banjo axle housing has a central portion that defines a receiving space and first and second openings that provide access to the receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space. The first half shaft extends within the first beam hollow, and the second half shaft extends within the second beam hollow. The electric drive unit includes a motor that drives rotation of a rotor shaft about an axis, a differential operably coupled with the rotor shaft, and a housing having a first housing component and a second housing component that is fastened to the first housing component at a junction, such that the first housing component is axially adjacent to the second housing component. At least one of the first housing component and the second housing component defines a motor housing region within which the motor is housed, the first and second housing components cooperate to define a gearbox region that extends through the first and second openings and within which the differential is housed, the first housing component defines a first aperture that provides access for operable coupling of the first half shaft with the differential, and the second housing component defines a second aperture that provides access for operable coupling of the second half shaft with the differential.

Embodiments of the third aspect of the disclosure can include any one or a combination of the following features:
  the entirety of the first housing component is positioned on a first axial side of the junction, and the entirety of the second housing component is positioned on a second axial side of the junction opposite the first axial side; and
  a sealing element extends axially between the first housing component and the second housing component at the junction.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-5, an electric axle assembly 10 includes a banjo axle housing 12. The banjo axle housing 12 includes a central portion 14 that defines a receiving space 16 and first and second openings 18, 20 that provide access to the receiving space 16. The banjo axle housing 12 includes a first beam 22 that extends from the central portion 14 in a first axial direction and a second beam 24 that extends from the central portion 14 opposite the first beam 22 in a second axial direction. The first beam 22 defines a first beam hollow 26 that is in communication with the receiving space 16, and the second beam 24 defines a second beam hollow 28 that is in communication with the receiving space 16. The electric axle assembly 10 includes a first half shaft 30 that extends within the first beam hollow 26 and a second half shaft 32 that extends within the second beam hollow 28. An electric drive unit 34 includes a motor 36 that drives rotation of a rotor shaft 38 about an axis 40, a differential 42 that is operably coupled with the rotor shaft 38, and a housing 44. The housing 44 includes a first housing component 46 and a second housing component 48 that is fastened to the first housing component 46 at a junction 50, such that the first housing component 46 is axially adjacent to the second housing component 48. At least one of the first housing component 46 and the second housing component 48 defines a motor housing region 52 within which the motor 36 of the electric drive unit 34 is housed. The first and second housing components 46, 48 cooperate to define a gearbox region 54 that extends through the first and second openings 18, 20. The differential 42 is housed within the gearbox region 54 defined by the first and second housing components 46, 48. The first housing component 46 defines a first aperture 56 that provides access for operable coupling of the first half shaft 30 with the differential 42. The second housing component 48 defines a second aperture 58 that provides access for operable coupling of the second half shaft 32 with the differential 42.

Figure 1:
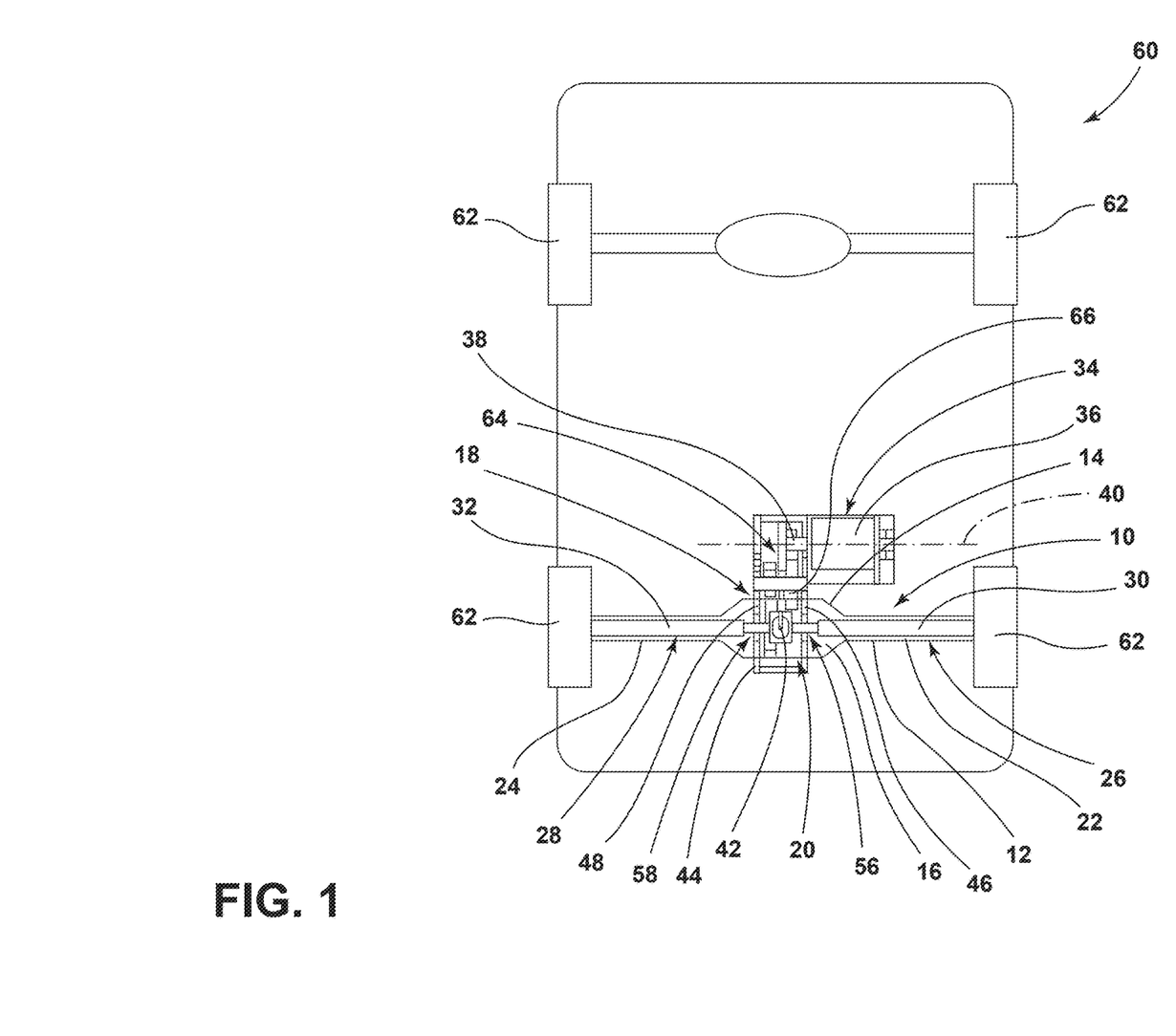
FIG. 1 is a schematic view of a vehicle, illustrating an electric axle assembly of a vehicle that includes a banjo axle housing and an electric drive unit coupled thereto.

Referring now to FIG. 1, a vehicle 60 is illustrated. The vehicle 60 may be an electric vehicle and/or a hybrid electric vehicle. In the embodiment illustrated in FIG. 1, the vehicle 60 includes the electric axle assembly 10. The electric axle assembly 10 includes the electric drive unit 34. The electric drive unit 34 includes the motor 36. The motor 36 can include a stator and a rotor (not shown) and may be configured to drive rotation of the rotor shaft 38 about the axis 40. In various implementations, the rotor shaft 38 is operably coupled with at least one wheel 62 of the vehicle 60, such that rotation of the rotor shaft 38 drives rotation of the at least one wheel 62. In various implementations, the electric drive unit 34 of the vehicle 60 includes a gear system 64. In the exemplary embodiment illustrated in FIG. 1, the electric drive unit 34 includes a transmission 66 and a differential 42. The transmission 66 and differential 42 are operably coupled with the rotor shaft 38, and the differential 42 is configured to be operably coupled with the first and second half shafts 30, 32, which are operably coupled with wheels 62 of the vehicle 60. As such, rotation of the rotor shaft 38 by the electric motor 36 may drive rotation of the first and second half shafts 30, 32 and the attached wheels 62 of the vehicle 60 via the operable coupling of the first and second half shafts 30, 32 to the rotor shaft 38 by the gear system 64.

Figure 2:
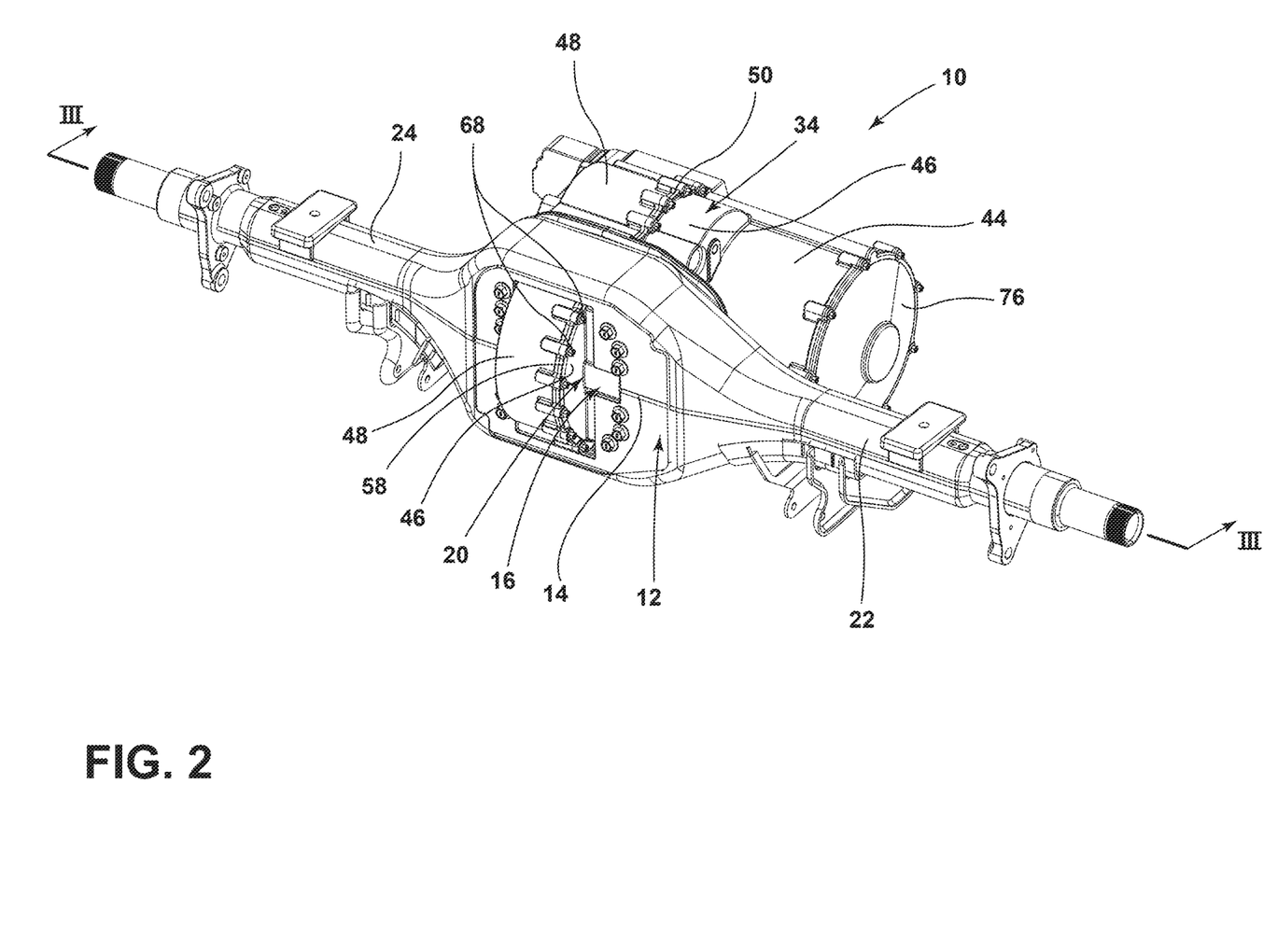
FIG. 2 is a perspective view of an electric axle assembly that includes a banjo axle housing and an electric drive unit that includes a housing having a first housing component and a second housing component that is fastened to the first housing component.
Figure 3:
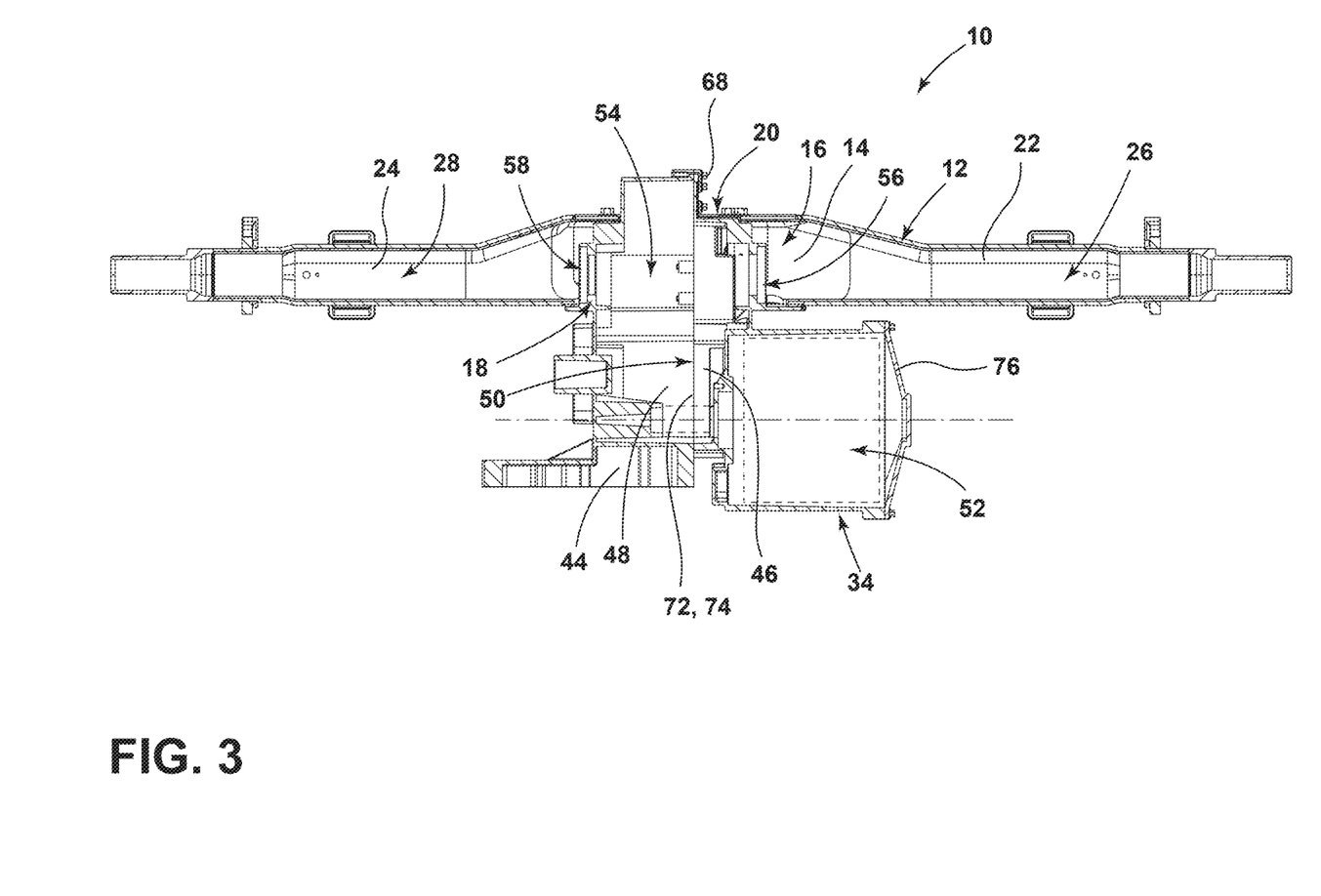
FIG. 3 is a cross-sectional view of the electric axle assembly of FIG. 2 taken at line III-III, illustrating a gearbox region that is defined by the first and second housing components of the housing of the electric drive unit.
Figure 4:
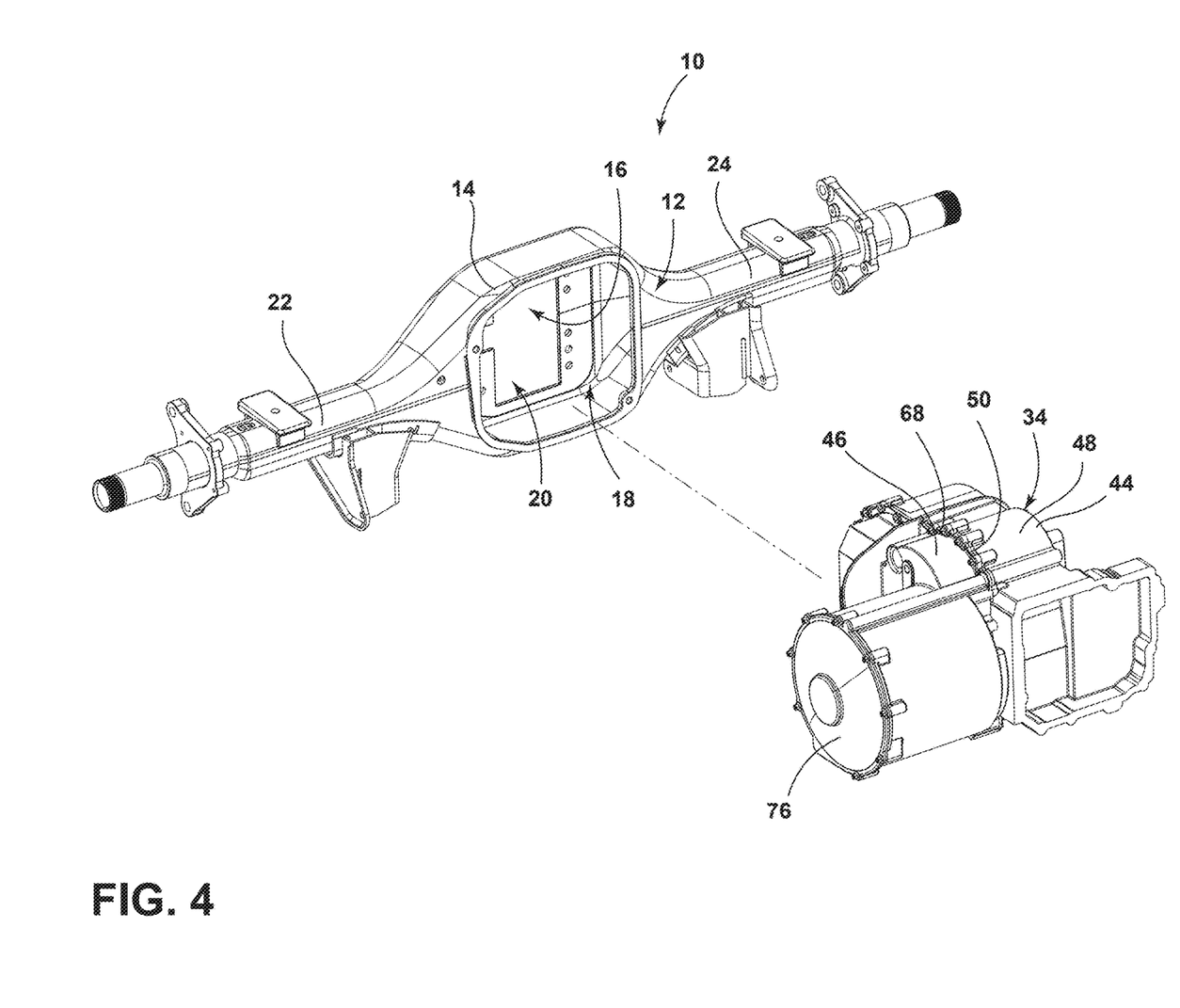
FIG. 4 is an exploded perspective view of the electric axle assembly, illustrating the banjo axle housing and the electric drive unit in a spaced relationship with the banjo axle housing.

Referring now to FIGS. 2-4, the electric axle assembly 10 includes the banjo axle housing 12. The banjo axle housing 12 includes the central portion 14. The central portion 14 defines the receiving space 16 and the first and second openings 18, 20 that provide access to the receiving space 16, as illustrated in FIG. 4. The banjo axle housing 12 includes the first beam 22 that extends from the central portion 14 in the first axial direction and the second beam 24 that extends from the central portion 14 opposite the first beam 22 in the second axial direction. The first beam 22 defines the first beam hollow 26 that is in communication with the receiving space 16, and the second beam 24 defines the second beam hollow 28 that is in communication with the receiving space 16, as illustrated in FIG. 3. In various implementations, the banjo axle housing 12 is configured to be mounted to an underside of the vehicle 60, such that the first and/or second openings 18, 20 that provide access to the receiving space 16 are disposed on vehicle-forward and/or vehicle-rearward sides of the banjo axle housing 12.

Referring now to FIGS. 2-5, in various implementations, the electric axle assembly 10 includes the electric drive unit 34. The electric drive unit 34 is configured to be mounted to the banjo axle housing 12. In various implementations, the housing 44 of the electric drive unit 34 is configured to be mounted to the banjo axle housing 12 by, for example, a plurality of fasteners, as illustrated in FIG. 2. In various implementations, the housing 44 of the electric drive unit 34 can be an assembly of a plurality of components. For example, the housing 44 can be a die-cast aluminum housing that is formed of a plurality of components that are fastened to each other. In various embodiments, the housing 44 can define a motor housing region 52 and a gearbox region 54. The motor 36 of the electric drive unit 34 may be housed within the motor housing region 52 and the gear system 64 (e.g., the transmission 66 and/or differential 42) of the electric drive unit 34 may be housed within the gearbox region 54 of the housing 44.

In the embodiment illustrated in FIGS. 2-5, the housing 44 of the electric drive unit 34 includes the first housing component 46 and the second housing component 48. The first housing component 46 is fastened to the second housing component 48. In various implementations, the first housing component 46 is fastened to the second housing component 48 at a junction 50, such that the first housing component 46 is axially adjacent to the second housing component 48. In various implementations, the entirety of the first housing component 46 is positioned on a first axial side of the junction 50, and the entirety of the second housing component 48 is positioned on a second axial side of the junction 50 opposite the first axial side. In some implementations, the first and second housing components 46, 48 are fastened to each other via at least one bolt 68. For example, in the embodiment illustrated in FIGS. 4 and 5, the first and second housing components 46, 48 are fastened to each other via a plurality of bolts 68. In some embodiments, at least one bolt 68 that fastens the first housing component 46 to the second housing component 48 includes a shaft 70, and the shaft 70 extends lengthwise in a direction that is parallel to the axis 40 about which the rotor shaft 38 is configured to rotate.

In various implementations, the housing 44 includes a sealing element 72 that extends axially between the first housing component 46 and the second housing component 48 at the junction 50. The sealing element 72 may be configured to seal the gearbox region 54 of the housing 44 that is defined by the first and second housing components 46, 48, as described further herein. A variety of types of sealing elements 72 that extend axially between the first and second housing components 46, 48 are contemplated. For example, the sealing element 72 may be a gasket 74, in some implementations. Alternatively, the sealing element 72 may be a sealant that is applied to at least one of the first housing component 46 and the second housing component 48 that define the junction 50.

Referring now to FIGS. 1-5, in various implementations, at least one of the first housing component 46 and the second housing component 48 defines the motor housing region 52 within which the motor 36 of the electric drive unit 34 is housed. As illustrated exemplarily in FIGS. 3 and 5, the first housing component 46 defines the motor housing region 52. As illustrated in FIGS. 2 and 3, the motor housing region 52 is disposed wholly outside of the receiving space 16 defined by the banjo axle housing 12. In some embodiments, the housing 44 can include an end cap 76. The end cap 76 may be fastened to the first housing component 46 and may cooperate with the first housing component 46 to define the motor housing region 52, as illustrated in FIGS. 2-5.

Referring still to FIGS. 1-5, the first and second housing components 46, 48 may cooperate to define the gearbox region 54 of the housing 44. As illustrated in FIG. 3, the first housing component 46 defines the portion of the gearbox region 54 disposed on the first axial side of the junction 50, and the second housing component 48 defines the portion of the gearbox region 54 on the second axial side of the junction 50. In various implementations, at least a portion of the gearbox region 54 that is defined cooperatively by the first and second housing components 46, 48 extends from outside of the receiving space 16, into the receiving space 16 via the first opening 18, and out of the receiving space 16 via the second opening 20, as illustrated exemplarily in FIG. 3. In the embodiment illustrated in FIG. 2, the first and second housing components 46, 48 extend into the receiving space 16 via the first opening 18 and out of the receiving space 16 via the second opening 20, and the first and second housing components 46, 48 cooperate to define the gearbox region 54 that extends into the receiving space 16 through the first opening 18 and out of the receiving space 16 through the second opening 20 that houses the differential 42 therein.

Figure 5:
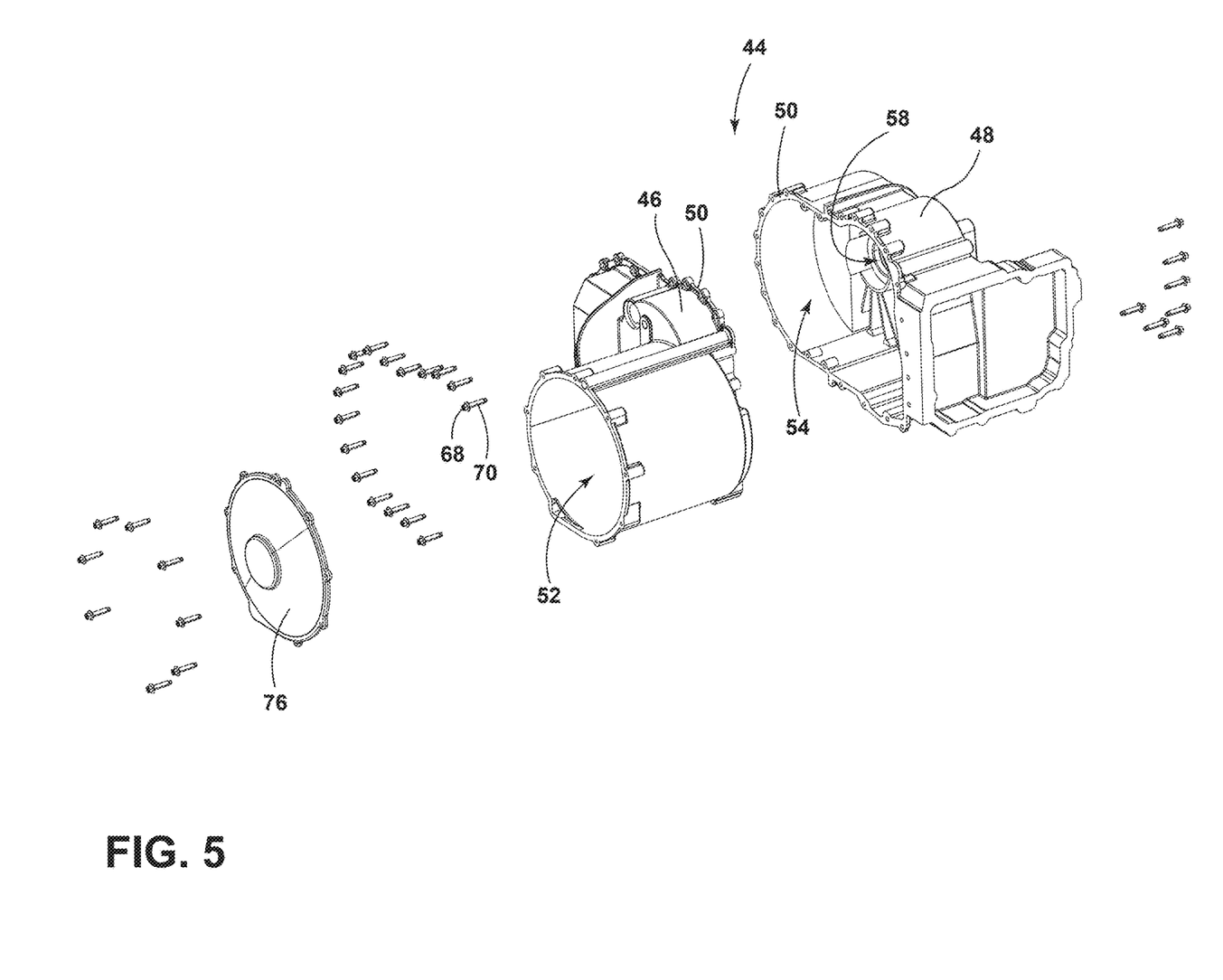
FIG. 5 is an exploded perspective view of a housing of an electric drive unit, illustrating a first housing component, a second housing component, and an end cap that is configured to be fastened to the first housing component.

Referring now to FIGS. 3 and 5, the first housing component 46 of the housing 44 may define a first aperture 56, and the second housing component 48 of the housing 44 may define a second aperture 58. The first aperture 56 may be configured to provide access for operable coupling of the first half shaft 30 with the differential 42 that is disposed within the gearbox region 54 of the housing 44. The second aperture 58 may be configured to provide access for operable coupling of the second half shaft 32 with the differential 42 disposed within the gearbox region 54 of the housing 44. In various implementations, the first and second half shafts 30, 32 may interface with the differential 42 directly. It is contemplated that intervening components, such as shafts, may extend between the differential 42 and the first and second half shafts 30, 32 and may be splined with the first and second half shafts 30, 32, in some embodiments.

The electric axle assembly 10 of the present disclosure may provide a variety of advantages. First, the housing 44 of the electric drive unit 34 having the first and second axially adjacent housing components 46, 48 may simplify machining necessary to create bearing pockets and oil passages within the housing 44. Second, the first and second housing components 46, 48 of the housing 44 defining the gearbox region 54 that extends through the second opening 20 of the banjo axle housing 12 out of the receiving space 16 allows for the electric axle assembly 10 to omit a differential cover that may typically be mounted to the exterior surface of the banjo axle housing 12 proximate to the second opening 20. Third, the first and second housing components 46, 48 respectively defining the first and second apertures 56, 58 may remove the need for the housing 44 to include bearing caps through which the first and second half shafts 30, 32 would typically extend and be supported.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 electric axle assembly
12 banjo axle housing
14 central portion
16 receiving space
18 first opening
20 second opening
22 first beam
24 second beam
26 first beam hollow
28 second beam hollow
30 first half shaft
32 second half shaft
34 electric drive unit
36 motor
38 rotor shaft
40 axis
42 differential
44 housing
46 first housing component
48 second housing component
50 junction
52 motor housing region
54 gearbox region
56 first aperture
58 second aperture
60 vehicle
62 wheel
64 gear system
66 transmission
68 bolt
70 shaft (of bolt)
72 sealing element
74 gasket
76 end cap

What is claimed is:

1. An electric axle assembly, comprising:
a banjo axle housing having a central portion that defines a receiving space and first and second openings that provide access to the receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space;
a first half shaft that extends within the first beam hollow;
a second half shaft that extends within the second beam hollow; and
an electric drive unit comprising:
a motor that drives rotation of a rotor shaft about an axis;
a differential operably coupled with the rotor shaft; and
a housing having a first housing component and a second housing component fastened to the first housing component, wherein at least one of the first housing component and the second housing component defines a motor housing region within which the motor is housed, the first and second housing components cooperate to define a gearbox region within which the differential is housed, the first housing component defines a first aperture that provides access for operable coupling of the first half shaft with the differential, and the second housing component defines a second aperture that provides access for operable coupling of the second half shaft with the differential, wherein the first housing component is fastened to the second housing component at a junction, such that the first housing component is axially adjacent to the second housing component, and wherein the junction at which the first housing component is fastened to the second housing component extends from outside of the receiving space, into the receiving space via the first opening, and out of the receiving space via the second opening.

2. The electric axle assembly of claim 1, wherein the first housing component defines the motor housing region.

3. The electric axle assembly of claim 2, wherein the motor housing region is wholly outside of the receiving space.

4. The electric axle assembly of claim 2, wherein the housing further comprises:
    an end cap that is fastened to the first housing component and cooperates with the first housing component to define the motor housing region.

5. The electric axle assembly of claim 1, wherein the first and second housing components extend into the receiving space via the first opening and out of the receiving space via the second opening.

6. The electric axle assembly of claim 1, further comprising:
    at least one bolt that fastens the first housing component to the second housing component, the bolt having a shaft extending lengthwise parallel to the axis within the first and second housing components.

7. The electric axle assembly of claim 1, wherein the entirety of the first housing component is positioned on a first axial side of the junction, and the entirety of the second housing component is positioned on a second axial side of the junction opposite the first axial side.

8. The electric axle assembly of claim 7, wherein a sealing element extends axially between the first housing component and the second housing component at the junction.

9. The electric axle assembly of claim 1, wherein a portion of the gearbox region that is defined cooperatively by the first and second housing components extends from outside of the receiving space, into the receiving space via the first opening, and out of the receiving space via the second opening.

10. An electric axle assembly, comprising:
    a banjo axle housing having a central portion that defines a receiving space and first and second openings that provide access to the receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space; and
    an electric drive unit comprising:
        a motor that drives rotation of a rotor shaft about an axis;
        a differential operably coupled with the rotor shaft; and
        a housing having a first housing component and a second housing component that is fastened to the first housing component at a junction, such that the first housing component is axially adjacent to the second housing component, wherein at least one of the first housing component and the second housing component defines a motor housing region within which the motor is housed, and the first and second housing components cooperate to define at least a portion of a gearbox region that extends from outside of the receiving space, into the receiving space via the first opening, and out of the receiving space via the second opening, and wherein the junction at which the first housing component is fastened to the second housing component extends from outside of the receiving space, into the receiving space via the first opening, and out of the receiving space via the second opening.

11. The electric axle assembly of claim 10, wherein the entirety of the first housing component is positioned on a first axial side of the junction, and the entirety of the second housing component is positioned on a second axial side of the junction opposite the first axial side.

12. The electric axle assembly of claim 11, wherein a sealing element extends axially between the first housing component and the second housing component at the junction.

13. The electric axle assembly of claim 10, wherein the first housing component defines the motor housing region.

14. The electric axle assembly of claim 13, wherein the motor housing region is wholly outside of the receiving space.

15. The electric axle assembly of claim 13, wherein the housing further comprises:
    an end cap that is fastened to the first housing component and cooperates with the first housing component to define the motor housing region.

16. The electric axle assembly of claim 10, further comprising:
    a first half shaft that extends within the first beam hollow; and
    a second half shaft that extends within the second beam hollow, wherein the first housing component defines a first aperture that provides access for operable coupling of the first half shaft with the differential, and the second housing component defines a second aperture that provides access for operable coupling of the second half shaft with the differential.

17. An electric axle assembly, comprising:
    a banjo axle housing having a central portion that defines a receiving space and first and second openings that provide access to the receiving space, a first beam that extends from the central portion in a first axial direction and that defines a first beam hollow in communication with the receiving space, and a second beam that extends from the central portion opposite the first beam in a second axial direction and that defines a second beam hollow in communication with the receiving space;
    a first half shaft that extends within the first beam hollow;
    a second half shaft that extends within the second beam hollow; and
    an electric drive unit comprising:
        a motor that drives rotation of a rotor shaft about an axis;
        a differential operably coupled with the rotor shaft; and
        a housing having a first housing component and a second housing component that is fastened to the first housing component at a junction, such that the first housing component is axially adjacent to the second housing component, wherein at least one of the first housing component and the second housing component defines a motor housing region within which the motor is housed, the first and second housing components cooperate to define a gearbox region that extends through the first and second openings and within which the differential is housed, the first housing component defines a first aperture that provides access for operable coupling of the first half shaft with the differential, and the second housing component defines a second aperture that provides access for operable coupling of the second half shaft with the differential, and wherein the junction at which the first housing component is fastened to the second housing component extends from outside of the receiving space, into the receiving space via the first opening, and out of the receiving space via the second opening.

18. The electric axle assembly of claim 17, wherein the entirety of the first housing component is positioned on a first axial side of the junction, and the entirety of the second housing component is positioned on a second axial side of the junction opposite the first axial side.

19. The electric axle assembly of claim 18, wherein a sealing element extends axially between the first housing component and the second housing component at the junction.

* * * * *